(12) United States Patent
Havemann et al.

(10) Patent No.: US 7,843,914 B2
(45) Date of Patent: *Nov. 30, 2010

(54) NETWORK SYSTEM HAVING AN EXTENSIBLE FORWARDING PLANE

(75) Inventors: Martin Havemann, Belford, NJ (US); Murakami Kazutaka, Freehold, NJ (US); Thomas Woo, Short Hills, NJ (US)

(73) Assignee: Alcatel-Lucent, Murray Hill, NJ (US)

( * ) Notice: Subject to any disclaimer, the term of this patent is extended or adjusted under 35 U.S.C. 154(b) by 410 days.

This patent is subject to a terminal disclaimer.

(21) Appl. No.: 11/824,565

(22) Filed: Jun. 29, 2007

(65) Prior Publication Data

US 2010/0226369 A9    Sep. 9, 2010

(51) Int. Cl.
*H04L 12/28* (2006.01)
*H04L 12/56* (2006.01)

(52) U.S. Cl. .................. 370/389; 370/392; 370/401

(58) Field of Classification Search .......... 370/392, 370/401, 230, 235, 253, 389, 463, 350, 410, 370/408, 395, 352, 565, 351; 709/220, 238, 709/240, 239, 223, 219; 379/93, 90
See application file for complete search history.

(56) References Cited

U.S. PATENT DOCUMENTS

| | | | |
|---|---|---|---|
| 6,606,325 B1 * | 8/2003 | Cain | 370/410 |
| 6,871,235 B1 * | 3/2005 | Cain | 709/239 |
| 6,952,728 B1 | 10/2005 | Alles et al. | |
| 7,042,888 B2 * | 5/2006 | Berggreen | 370/401 |
| 7,254,114 B1 | 8/2007 | Turner et al. | |
| 7,315,900 B1 | 1/2008 | Ofelt et al. | |
| 7,546,635 B1 * | 6/2009 | Krohn et al. | 726/11 |
| 2003/0058872 A1 * | 3/2003 | Berggreen et al. | 370/401 |
| 2003/0223361 A1 | 12/2003 | Hussain et al. | |
| 2004/0083403 A1 | 4/2004 | Khosravi | |
| 2006/0123481 A1 | 6/2006 | Bhatnagar et al. | |
| 2007/0058632 A1 | 3/2007 | Back et al. | |
| 2007/0168475 A1 | 7/2007 | Mullahy et al. | |
| 2008/0075016 A1 | 3/2008 | Ashwood-Smith | |
| 2009/0003349 A1 * | 1/2009 | Havemann et al. | 370/392 |

FOREIGN PATENT DOCUMENTS

| | | |
|---|---|---|
| WO | 03103238 A1 | 12/2003 |
| WO | 2004021652 A2 | 3/2004 |

* cited by examiner

*Primary Examiner*—Pankaj Kumar
*Assistant Examiner*—Prenell P Jones
(74) *Attorney, Agent, or Firm*—Brosemer, Kolefas & Assoc.

(57) ABSTRACT

A platform for seamlessly hosts a plurality of disparate types of packet processing applications. One or more applications are loaded onto a service card on the platform. A programmable path structure is included that maps a logical path for processing of the packets through one or more of the plurality of service cards according to characteristics of the packets. Multiple path structures may be programmed into the platform to offer different service paths for different types of packets.

18 Claims, 12 Drawing Sheets

| Characteristic | Classifier | Service Path |
|---|---|---|
| Type A | X | 1 |
| Type B | Y | 2 |
| .... | .... | .... |
| Type XX | ZZ | N |

NETWORK SYSTEM HAVING AN EXTENSIBLE FORWARDING PLANE

CROSS-REFERENCE TO RELATED APPLICATIONS

The present patent application is related to the following U.S. patent applications, filed concurrently herewith, and commonly assigned herewith: U.S. patent application Ser. No. 11/824,482, entitled "OPEN PLATFORM ARCHITECTURE FOR INTEGRATING MULTIPLE HETEROGENEOUS NETWORK FUNCTIONS"; and U.S. patent application Ser. No. 11/824,555 entitled "NETWORK SYSTEM HAVING AN EXTENSIBLE CONTROL PLANE". The contents of the aforementioned applications are fully incorporated herein by reference.

TECHNICAL FIELD

The present invention relates generally to networking, and more specifically, to integrating different networking applications on a single platform.

BACKGROUND

Edge devices provide packet connectivity entry points into a core network. They typically control and analyze the flow of traffic entering the core network, provide security to the core network by preventing harmful traffic from entering it, or provide enhancements to applications.

Examples of edge devices that monitor and analyze traffic, include traffic monitoring systems, traffic analysis systems, flow replication systems, and various other systems that monitor and control the type of traffic entering the core network.

Examples of edge devices that analyze the content of data entering the network to provide security to the core network include firewalls and detection/prevention equipment.

Briefly, a firewall refers to a device which limits access to a network by only allowing authorized flows/users access to a private network.

Whereas, detection/prevention equipment refers to systems that identify and block malicious code from entering a network, such as, but not limited to: computer viruses, worms, trojan horses, spam, malware, spyware, adware, and other malicious and unwanted software. Intrusion detection equipment may also include systems that detect when an attack is being perpetrated on a core network, such as a denial-of-service attack.

Examples of edge devices that provide enhancement of applications include applications that enhance the flow of packets, content adaptation applications, and acceleration application functions.

In many instances companies and organizations will purchase the best-in-class edge device solutions for use at the edge of a network. For example, an organization may purchase Vendor A's virus detection product, Vendor's B firewall, Vendor's C flow replication product, and Vendor's D router, because each is the best-in-class or for some other reason.

As a result most devices found at the edge of a core network, are a hodgepodge of dissimilar interconnected devices each performing a different task. The total cost for setting-up and operating these disparate edge solutions is soaring out of control. Besides purchasing all these different solutions, there are costs associated with keeping the equipment running, and managing software on all of the disparate pieces of equipment. Moreover, adding equipment to the edge of the network to handle growing network demands is often complicated and inflexible.

Furthermore, with multiple types of equipment needed to examine packets for different purposes, such as malware, DDoS, firewalls, routing, and so forth, there may be multiple examinations of packets between the time a packet is received at the edge of a network, and the time it is routed to a destination. Unfortunately each time a packet is examined and analyzed there is a delay incurred, which is undesirable, especially for packets that require quality-of-service, such as packets containing real-time data such as voice or video.

Presently, there is no flexible way to service different types of packets or traffic flows. When a packet enters the edge it is routed through a fixed series of vendor's solutions. There is little choice on selecting which services are performed on each packet entering a network, regardless of the type of packet. For example, it is difficult for certain packet types having a higher priority level (or trusted source) to bypass certain packet analysis equipment to increase efficiency. It is also difficult to thread (e.g. route) packet flows through different combinations of vendor's devices and services.

Furthermore, much of the functionality provided by different vendors equipment has fixed functionality limited in scope to particular application. Accordingly, while it may be possible to reprogram (upgrade) the particular application for its intended use, it is not presently possible to dynamically reprogram a device to change its intended purpose entirely. For example, it is not presently possible to convert a device for running spyware into a device for performing transcoding.

Thus, there is presently a desire to more efficiently service packets entering a network to reduce the quantity of examinations to a minimum desired level per packet type. There is also a desire to ensure Quality of Service is not sacrificed with the ability to route certain packets classified at the highest priority level through a more efficient examination process at the edge of a network. Further, there is also a present desire to simplify and more flexibly integrate the various disparate types of functionalities performed at the edge of a network or elsewhere, often provided by different vendors.

SUMMARY

To address the above-discussed deficiencies of the prior art, the present invention provides a single network platform that seamlessly hosts a plurality of disparate types of packet processing applications, where each application may be provided by different vendors. As used herein a "platform" may include a single physical device, or may include multiple devices linked together (at one or more sites), but administered logically as a single network entity.

In one embodiment, the platform includes a plurality of service cards forming a forwarding plane, each service card configured to execute one or more particular packet processing applications (applications) associated with performing network security, transcoding, traffic analysis, or other packet processing functionalities. The platform may also include one or more input/output (I/O) cards each card configured to route the packets from ingress to egress of the platform. A programmable service path structure is included that maps a logical path for processing of the packets through one or more of the plurality of service cards and one or more of the I/O cards, according to characteristics of the packets. Multiple path structures may be programmed into the network platform to offer different service paths for different types of packets.

In one embodiment, decisions as to how a packet enters or exits the platform (i.e., forwarding of a packet from the platform) are segregated from decisions as to which applications are traversed (e.g., executed) for processing a packet.

In another embodiment, a fabric is included on the platform having a plurality of input and output ports configured to physically route the packets from and to one or more plurality of service cards and one or more I/O cards, according to the programmable service path structure.

In another embodiment, each service card may be reprogrammed dynamically during runtime, such as upgrading an application or completely deleting an application and replacing it with a new application having a completely new purpose and functionality. For example, it is possible to dynamically reconfigure a service card from executing an application associated with performing virus protection to executing an application associated with transcoding.

A feature and advantage of the innovative platform is the ability to incorporate traditional functionality of a router coupled with the ability to flexibly integrate multiple network packet service applications, usually found in separate devices.

Additional exemplary implementations and features/advantages are described in the Detailed Description in conjunction with the accompanying drawings below.

BRIEF DESCRIPTION OF THE DRAWINGS

The detailed description is explained with reference to the accompanying figures. In the figures, the left-most digit(s) of a reference number identifies the figure in which the reference number first appears. It should be noted that the figures are not necessarily drawn to scale and are for illustration purposes only.

DETAILED DESCRIPTION

Introduction

Reference herein to "one embodiment", "an embodiment", "an implementation" or "one implementation" or similar formulations herein, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In the following description, for purposes of explanation, specific numbers, materials and configurations are set forth in order to provide a thorough understanding of the present invention. However, it will be apparent to one skilled in the art that the present invention may be practiced without each specific example. In other instances, well-known features are omitted or simplified to clarify the description of the exemplary embodiments of the present invention, and thereby, to better explain the present invention.

Exemplary Environment

Figure 1:
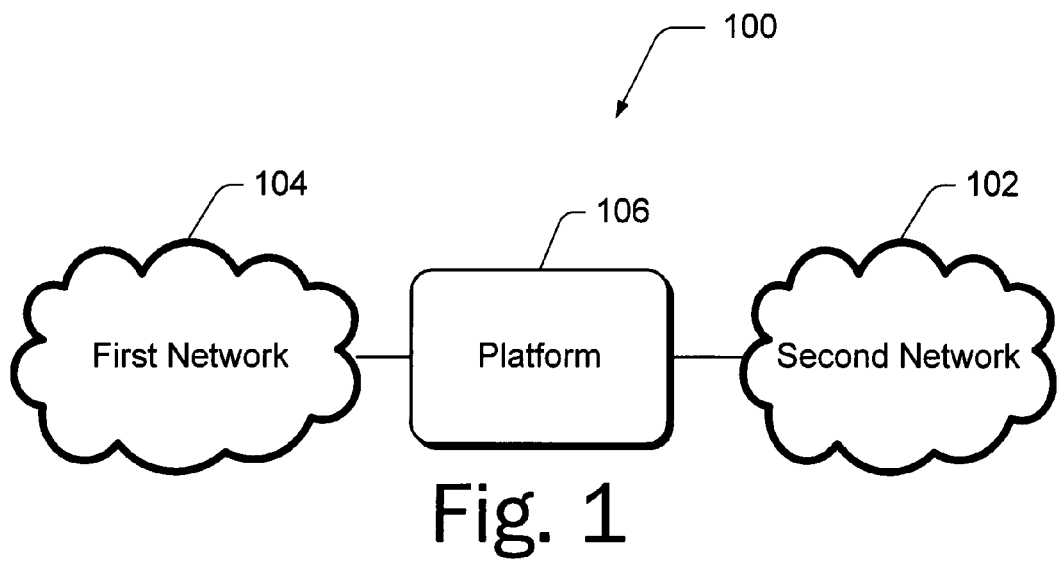
FIG. 1 illustrates an exemplary environment in which the invention may be implemented.

FIG. 1 illustrates an exemplary environment 100 in which the invention may be implemented. Environment 100 includes a first network 102 and a second network 104. First network 102 and second network 104 are computer or telecommunication networks. For instance, in one embodiment first network 102 is a core network. A core network typically forms a backbone of a communications network (i.e., service provider) and includes a combination of high capacity switches and other data transmission devices.

Whereas, second network 104 is a computer or telecommunication network that may be connected to a service provider network, and may have different administrative authorities. For instance, in one embodiment, second network 104 is an access network, which forms a portion of a communications network which connects users and other networks to first network 102, and vice versa. In other embodiments second network 104 may represent another core network, or a customer network, such as that of a private organization or government entity.

Interposed between first network 102 and second network 104 is a packet services platform (platform) 106 for routing packets from access network 104 to core network 102, and vice versa.

In one embodiment, platform 106 resides at the edge of a network, but can be located at points within a network other than the edge of a network. Platform 106 is used to facilitate communications between networks 102 and 104. For example, in the illustration of FIG. 1, platform 106 provides connectivity access between first network 102 and second network 104. Platform 106 may also provide connectivity between other core networks or access points.

Platform 106 hosts a plurality of disparate network functionalities in a single integrated platform. Each of the disparate network functionalities may be selected from different vendors. Examples of the different types of functionality that may be incorporated in platform 106 include, but are not necessarily limited to: packet routing, security services (such as firewall(s), Denial of Services detection, malware detection), packet analysis (such as traffic accounting, and flow monitoring), and other present or future packet service technologies.

Thus, platform 106 according to one aspect of the invention includes all the traditional functionality of a router coupled with the ability to flexibly integrate multiple network packet service applications, usually found in separate devices.

Exemplary Packet Services Platform

Figure 2:
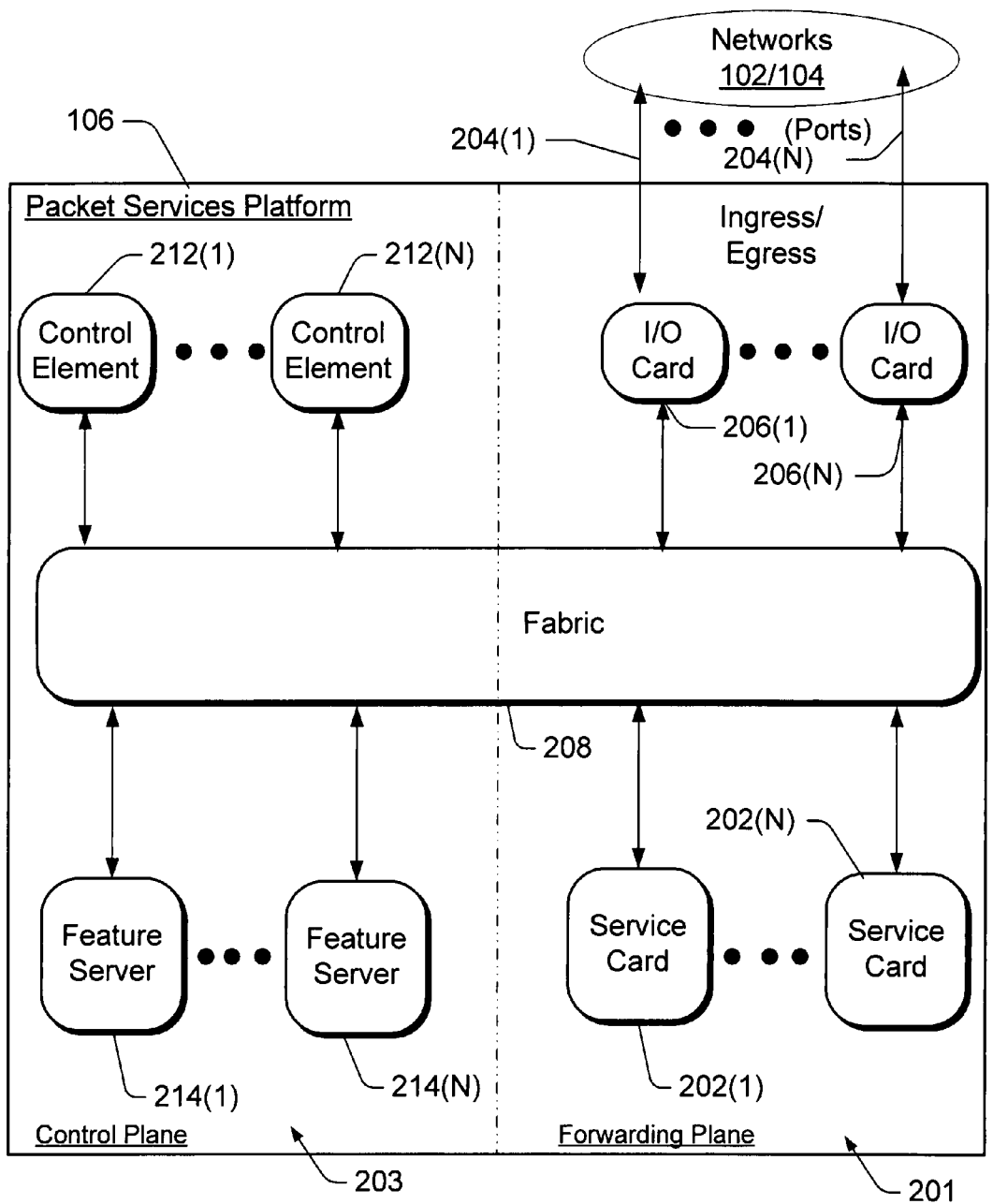
FIG. 2 illustrates a packet services platform (platform 106) within which the present invention can be either fully or partially implemented.

FIG. 2 illustrates a packet services platform (platform 106) within which the present invention can be either fully or partially implemented. In one implementation, platform 106 includes a plurality of service cards 202(1), . . . , 202(N), input/output cards 206, a fabric 208, control elements 212, and feature services 214. The index "N" as used in the figures denotes a number that is equal to or greater than 1. The index N may represent a different quantity of devices per device. For example, N may equal eight with respect to service cards, but may only refer to the number two, with respect to I/O cards 206.

The interface between first network 102 and second network 104 is provided by input/output (I/O) cards 206 for receiving packets from second network 104 and sending the packets to a destination via first network 102, and vice versa.

Packets may be in the form of data or control packets. As used herein a packet refers to any formatted block of information carried by a network. In certain examples herein, the term packet, may refer to a single packet, packet flows (a collection of packets) or some other delineation of one or more packets, such as frames.

Platform 106 generally includes a forwarding plane 201 and a control plane 203. In general, forwarding plane 201 transports packets and performs packet processing services associated with the flow of packets. Control plane 103 processes control information for managing and administering platform 106.

Incoming packets enter ports of I/O cards 206 and are sent to either forwarding plane 201 or control plane 203 of platform 106. That is, incoming packets enter I/O cards 206 and are forwarded to one or more service cards 202, control elements 212, or feature servers 214, via fabric 208. Incoming packets may also be forwarded directly to another I/O card 206 if no additional services are needed, such as for egress. I/O cards 206 generally determine whether packets are sent to either forwarding plane 201 or control plane 203 when received by the cards. However, in other implementations, other elements may determine whether packets are sent to forwarding plane 201 or control plane 203. For example, a service card 202 may perform the function of an I/O card.

Service cards 202 comprise a portion of a forwarding plane for platform 106 for processing packets. Each service card 202 includes at least one packet processing application for performing a packet processing service. Examples packet processing services include: performing policy enforcement (such as implementing firewall(s), and traffic conditioners), performing intrusion detection and prevention (such as Denial of Services detection, malware detection), performing packet analysis (such as accounting/metering and traffic monitoring), performing Network Address Translation, transcoding, or other suitable packet services that may be deployed in a network. Other packet processing services may be performed as would be readily appreciated by those skilled in the art having the benefit of this disclosure.

In one implementation, at least one service card 202 is physically implemented as a slot card, also commonly referred to as a blade or circuit pack that is processor-based with the ability to execute code, associated with one or more network applications.

It should be appreciated by those skilled in the art after having the benefit of this disclosure that a service card may take other forms. For example, in one implementation, a service card 202 may be implemented in firmware such as using configurable Field Programmable Gate Arrays (FPGAs) and may be reprogrammable.

In still another implementation, a service card 202 may be hardware based, such as implemented using Application Specific Integrated Circuits (ASIC).

Although shown as residing on platform 106, it is appreciated by those skilled in the art after having the benefit of this disclosure, that one or more service cards 202 may be remote from platform 106. For instance, service cards 202 may be multiple hops away from platform 106, and not co-located therein.

I/O cards 206(1) . . . , 206(N), form a portion of the forwarding plane for platform 106. One or more I/O cards 206 are configured to route a packet from ingress to egress of platform 106. That is, each I/O card 206 may process an incoming packet received from I/O ports 204 or fabric 208, and may send it to an appropriate I/O port 204 for forwarding.

I/O cards 206 may also process an incoming packet previously processed by one or more service cards 202 or other I/O cards 206 via fabric 208. I/O cards 206 process packets, and may make routing decisions including such as determining a next-hop or destination for packets, based on forwarded rules loaded onto I/O cards 206 via fabric 208 by control elements 212.

Alternatively, in another embodiment, one or more service cards 202 may form part of the forwarding for platform 106. That is, one or more service cards 202 may process packets, and make routing decisions including determining a next-hop or destination for packets, based on routing rules loaded onto service cards 202 via fabric 208 by control elements 212. Packets may be forwarded to a next-hop destination via a fabric 208, and a port 204 of an I/O card 206.

Although shown as residing on platform 106, it is appreciated by those skilled in the art after having the benefit of this disclosure, that one or more I/O cards 206 may be remote from platform 106. For instance, I/O cards 202 may be multiple hops away from platform 106, and not co-located therein.

Control elements 212 form a portion of control plane 203 for platform 106. Control elements 212 may transmit configuration information for configuring service cards 202, and I/O cards 206. Also, feature server 214 (to be described in more detail) may transmit configuration information to configure service cards 202. Additionally, control elements 212 may also configure feature servers 214 to install new feature server applications. Control elements 212 may interact with logic (not shown) for controlling fabric 208 to effectively establish connections between service cards 202 and the I/O cards 206. Control elements 212 may also provide information to service cards 202 for routing packets within platform 106, referred to as a "programmable service path structure" (see FIGS. 3-5 to be described). The programmable service path structure may be conveyed to each service card 202 via fabric connection 208.

Control elements 212 may also communicate with fabric connection 208 to establish connections between service cards 202 and I/O cards 206. Control elements 212 maintain knowledge of links status between network elements (not shown) in network 102, route changes, and update information when changes are made in routing configurations. Control elements 212 may also provide control for the overall general operation of platform 106.

Although shown as residing on platform 106, it is appreciated by those skilled in the art after having the benefit of those disclosure, that one or more control elements 212 may be remote from platform 106. For instance, control elements 212 may be multiple hops away from platform 106, and not co-located therein. Accordingly, when platform 106 boots-up (powers-on), platform 106 discovers control elements 112, which become associated with platform 106. In such an implementation, some logic or control unit provides initial direct contact between the data plane and control plane. Further details of how control elements 212 may be bound to forwarding plane 201, such as during boot-up are described in commonly owned U.S. Patent Application Publication No. 20060092974 entitled "Softrouter", which is fully incorporated in its entirety herein by reference.

It should also be appreciated by those skilled in the art, after having the benefit of this disclosure that FIG. 2 illustrates only one embodiment for implementing control plane 203 for platform 106. Although several control elements 212 are shown in FIG. 2, it is appreciated that control plane 203 may only include a single control element. Additionally, some portions of control plane 203 may be implemented remotely as described above, while some portions of control plane 203 may reside on the same physical platform as forwarding plane 201. It should also be appreciated that forwarding plane 201 and control plane 203 are illustrated as being logically distinct from each other, but may physically reside and/or operate in an integrated fashion.

Fabric 208 is illustrated as a single block and serves a communication hub for all elements comprising in platform 106. Fabric 208 may be implemented as a cross-bar switch, interconnected switches, other suitable cross-point technology, and a combination of such connectivity technology, as would be appreciated by those skilled in the art having the benefit of this disclosure.

For instance, in one implementation, fabric 208 may include an internally contained switched network, such as a Gigabit Ethernet network using several Ethernet switches acting in concert.

Fabric 208 also facilitates multiple parallel communication sessions of traffic, as well as, permits multiple entities, such as control elements 212 and service cards 202, to communicate with each other in a simultaneous fashion. It is noted that while fabric 208 is generally shown to reside within a single platform or chassis, it is possible that one or more portions of fabric 208 may be distributed across a network at different sites and linked together forming a single mass fabric.

As shall be explained, the intra-routing of packets (i.e., the path structure) within platform 106 is programmable. That is, the exact order of servicing packets by service cards 202 is completely configurable. Thus, platform 106 facilitates the integration of functions provided by each service card 202 into programmable combinations of one or more different services, each such combination of services performed on incoming packets based on characteristics of the packets.

Exemplary Programmable Service Combinations

Figure 3:
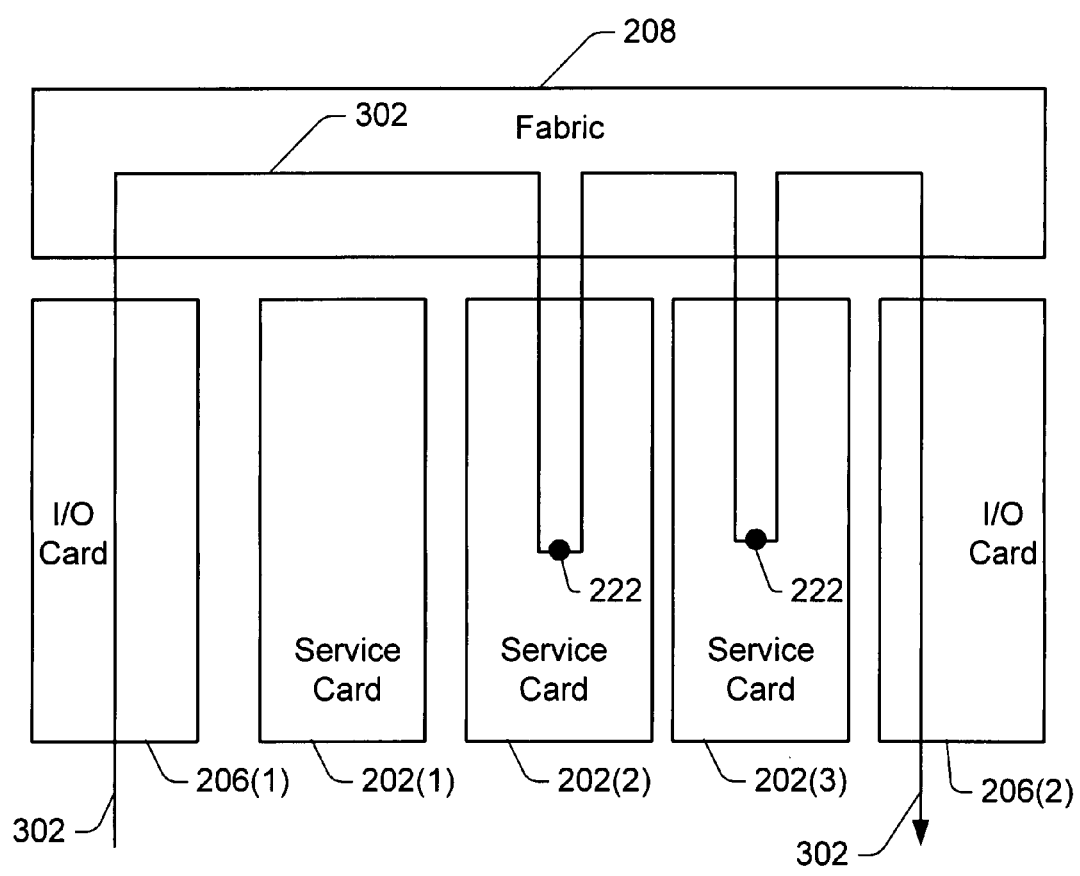
FIG. 3 illustrates a logical service path structure for routing packets by the platform.

FIG. 3 illustrates a logical service path structure 302 for routing packets by platform 106. Logical service path structure 302 maps a logical path for processing of a packet through one or more of a plurality of service cards 202 according to characteristics of a packet received by platform 106.

In the illustrated example, a packet is received at an ingress port by I/O card 206(1) and forwarded to service card 202(2) via fabric 208, according to logical service path structure 302. The packet is processed by at least one application 222 associated with a service card 202(2), and forwarded to a next service card 202(3). Next, the packet is serviced by at another application 222 on service card 202(3), and forwarded to I/O card 206(2), in accordance with logical service path structure 302. Finally, the packet is forwarded to first network 104 or second network 102 via an egress port 204 of I/O card 206(2).

Figure 4:
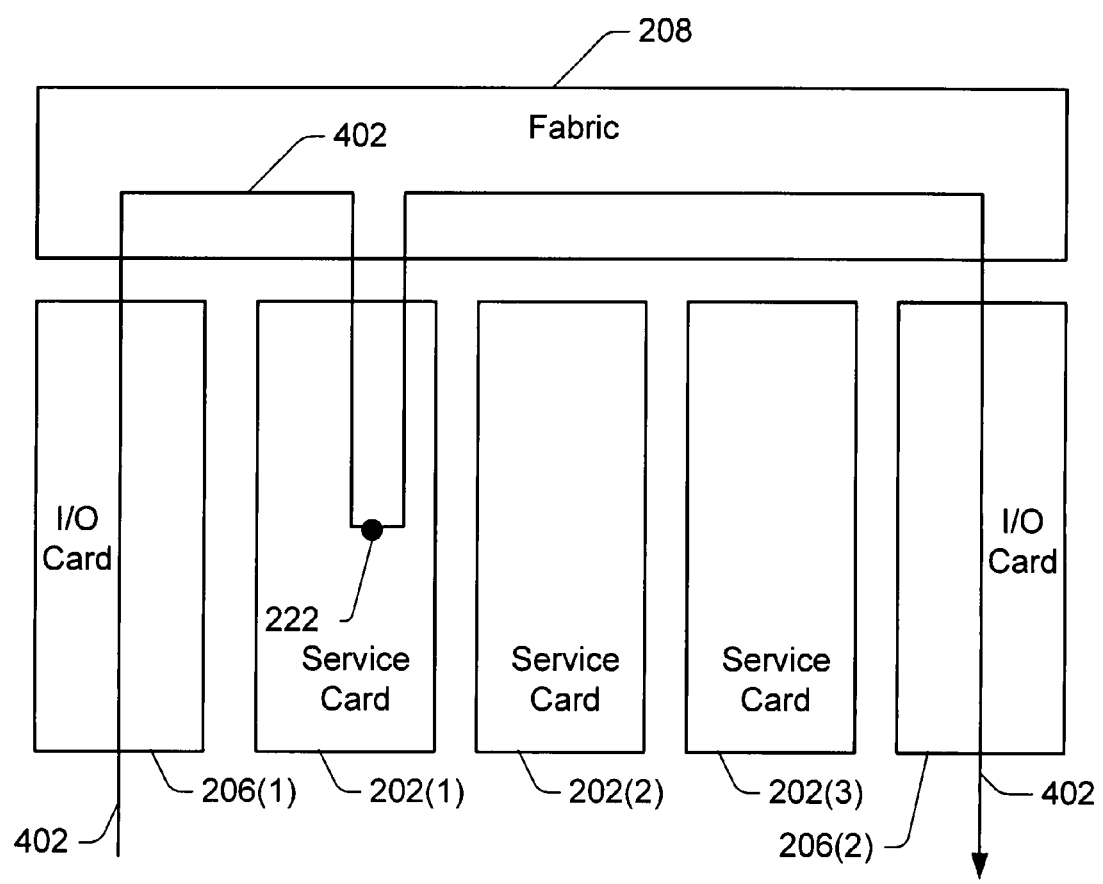
FIG. 4 shows another one of a myriad of exemplary logical service path structures for routing packets.

FIG. 4 shows another one of a myriad of exemplary logical service path structures (e.g., service path structure 402) for routing packets by platform 106. In this example, according to service path structure 402 a packet flow is serviced by application 222 on service card 202(1), and then skips service cards 202(2) and 202(3), prior to egress port 204 via I/O card 206(2).

Figures 5, 6:
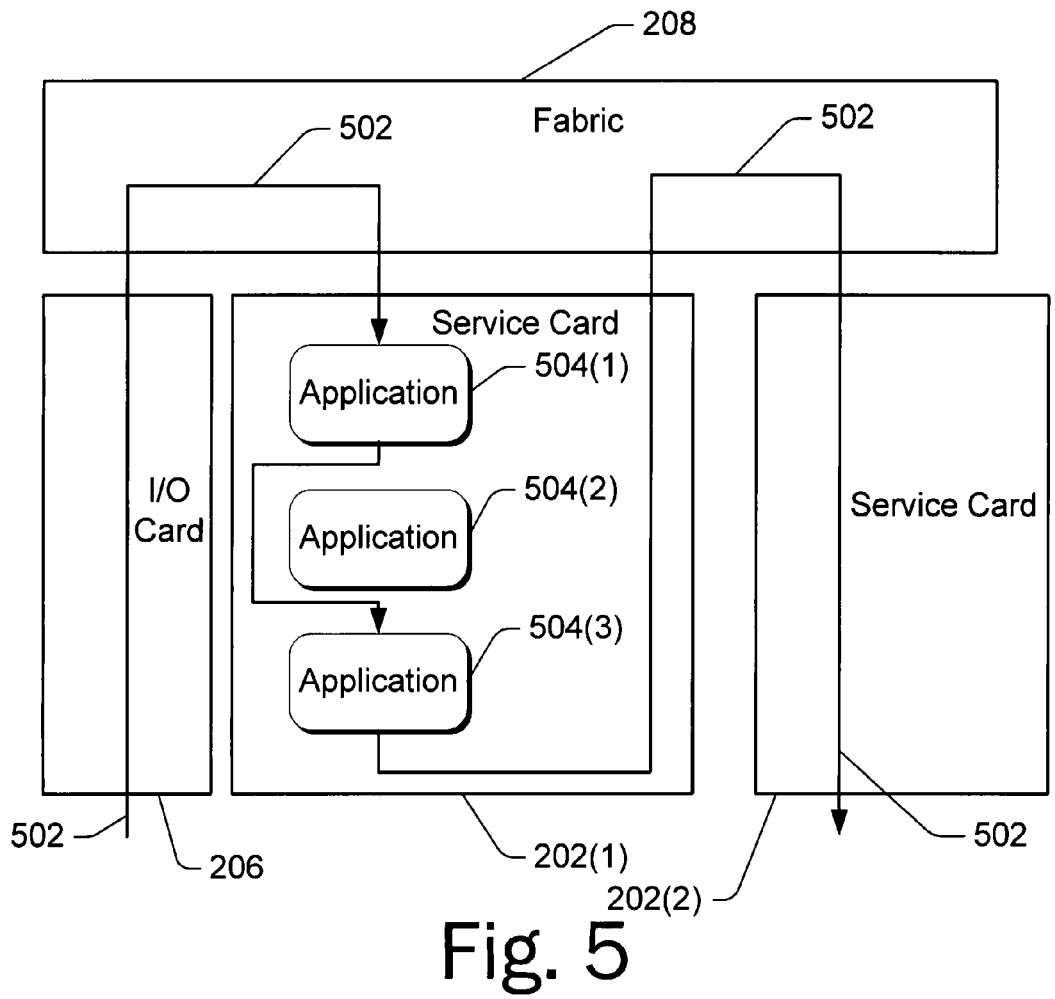
FIG. 5 shows another example of a programmable service path structure for servicing and processing packets.
FIG. 6 shows a chart illustrating various characteristics for packets and corresponding programmable classifiers and logical paths for servicing the packets.

FIG. 5 shows another example of a programmable service path structure 502 for servicing and processing packets by platform 106. In this example, there may be multiple discrete applications 504(1), 504(2), and 504(3) available on a service card 202(1) for processing packets. Each application 504 has the capability to perform a class of processing directly to, or associated with a packet. In one implementation, each class of processing associated with an application is typically loaded as discrete code into a service card 202.

As shown in FIG. 5, when transporting a packet from ingress to egress of a platform 106, programmable service path structure 502 is configured to select and link one or more applications 504(1), and 504(3) together. Programmable service path structure 502 is also configured to bypass one or more applications, such as application 504(2), when a packet traverses service card 202(1).

Thus, a service card 202(1) may contain multiple applications 504 and each of these particular applications may be selected or bypassed in accordance with programmable service path structure 502.

It is noted that while the above example only shows three network service applications, it should be appreciated by those skilled in the art after having benefit of this disclosures that a service card may include more or less applications.

FIG. 5 also shows that a service card, or a network function implemented on a service card, such as by service card 202(2) may provide I/O functionality with the ability to select next-hop destinations for packets or packet flows.

Thus, based on the examples of FIGS. 3, 4 and 5, it should be apparent to those skilled in the art that the logical path (i.e., a programmable service path structure) that each packet flow takes when traversing through platform 106 may be programmed into platform 106. Thus, FIGS. 3, 4, and 5 show logical paths for processing a packet flow from ingress to egress platform 106.

In order to link the completion of an application performed in a service card 202 to the start of another (in the same card or on a different card), a message system may be utilized to transport packets, facilitating a packet flow through platform 106.

In one implementation, the message system uses a service path flow-ID (a pointer to the next module, I/O card, or port), which is looked-up by a service card indicating a next hop for a packet flow. A next hop ID is then encoded into a header of a packet flow, indicating its next destination. Accordingly, each sub-path (e.g., segment) of a programmable service path structure provides the information necessary to link the next service card 202 or a series of service cards 202 for servicing a packet.

In another implementation, an entire sequence of service cards 202 and applications forming a programmable service path structure may be determined upon ingress of packets to platform 106. In such a scenario a flow ID may be embedded in the header(s) of a packet indicating which service flow (path/sub-paths) to take. In such an implementation, I/O cards 206 may determine appropriate service cards 202 which traffic should be directed when the packets are first received. Multiple sequential applications to perform a sequence of services and functions may be performed using service cards 202 which may be daisy chained together through connections established via fabric 208.

In another implementation, characteristics of the packets may be used to determine which sequence of service cards 202 comprising a logical service path structure is chosen for routing a packet flow through platform 106.

FIG. 6 shows a chart illustrating various characteristics for packets and corresponding programmable classifiers and programmable service path structures for servicing the packets.

For instance, suppose packets of a characteristic type A have a classifier X encoded therein which determines which one of a plurality of programmable service path structures (i.e., Service Path 1, Service Path 2, Service Path 3, . . . , or Service Path N) a packet flow is to follow. Each programmable service path structure contains a sequence of applications which may include one or more service cards 202 as well as applications per module. Suppose the programmable service path structure corresponding to classifier X is Service Path 1. Further suppose that the programmable service path structure for Service Path 1 includes service application 1 (a firewall), service application 2 (virus detection) and then an I/O card 206 (routing). This logical path could be programmed into I/O cards 206 and service cards 202, such that any packet received with classifier X causes the I/O cards 206, and service cards 202 to forward each packet according a programmable service path structure corresponding to Service Path 1.

Figure 7:
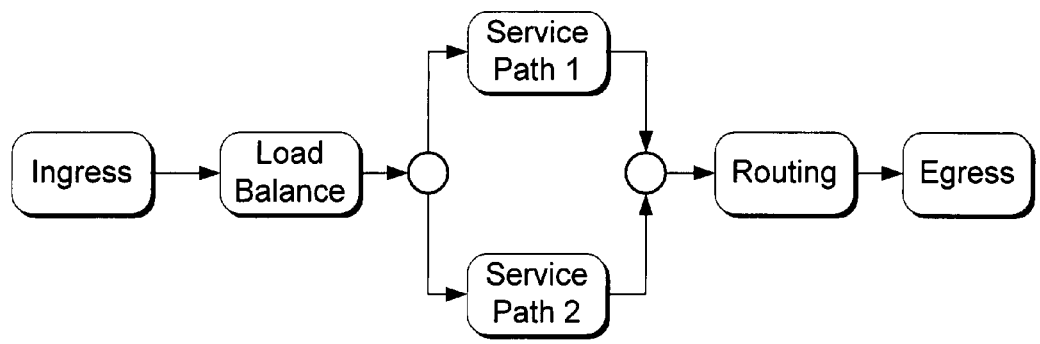
FIG. 7 shows a logical view for forwarding packets from ingress to egress of a platform that includes load balancing capability.

FIG. 7 shows a block diagram of a sample programmable service path structure that may include two different Service Paths: Service Path 1 or Service Path 2.

Characteristics that may be utilized to determine how a packet is routed through platform 106 include the source of the packets, whether the source is trusted or not, the type of packets (i.e., data, control, video, etc.), the quality-of-service associated with the packets, and so forth. Any characteristic associated within a packet such as a field within its header or data associated with a payload, may be used to determine which service path is selected (Service Path 1, Service Path 2, . . . , or Service Path N,).

Thus, in a path routing implementation, an entire sequence of applications embedded on one or more service cards, and I/O cards, is selected upon entry to platform 106 using a flow classifier.

In another implementation, the programmable service path structure may be dynamically determined on-the-fly. That is, a next hop within platform 106 is determined anew after each I/O card or service card using packet classifications. For example, a service card may select one of two different service cards to distribute traffic if either such cards were included as part of a next-hop.

In another embodiment, a service card 202 may also determine which programmable service path a packet flow is to follow based on characteristics of the packets.

FIG. 7 shows a logical view for forwarding packets from ingress to egress of platform 106 that includes load balancing capability. In this example, packets may either follow service path 1 or service path 2, based load balancing of traffic flow. Each service path includes one or more applications for processing packets.

Figure 8:
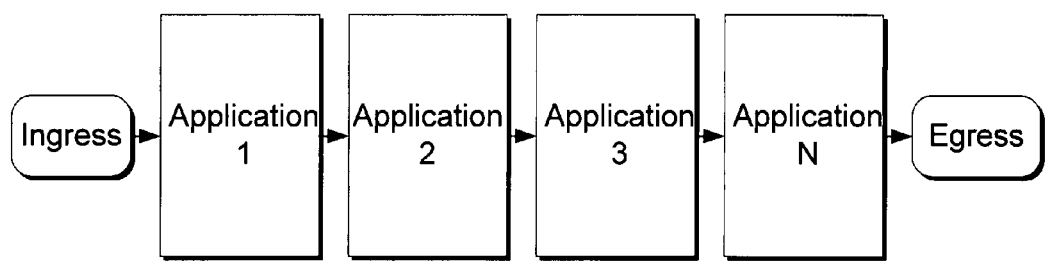
FIG. 8 shows another logical view of a data path for the flow of packets, which is linear.

A programmable service path structure may be linear, such as shown FIG. 8, in which a first service application is executed, followed by a second subsequent service application, followed by a next service application, and so forth, until all service applications are executed within a service path structure. Furthermore, each one of the applications 1, 2, 3, . . . through N, forming the programmable service path structure, is configurable and reconfigurable. Different applications can be added or removed from the service path simply by re-programming/re-configuring one or more of the I/O cards, the service cards through the control plane.

Figure 8A:
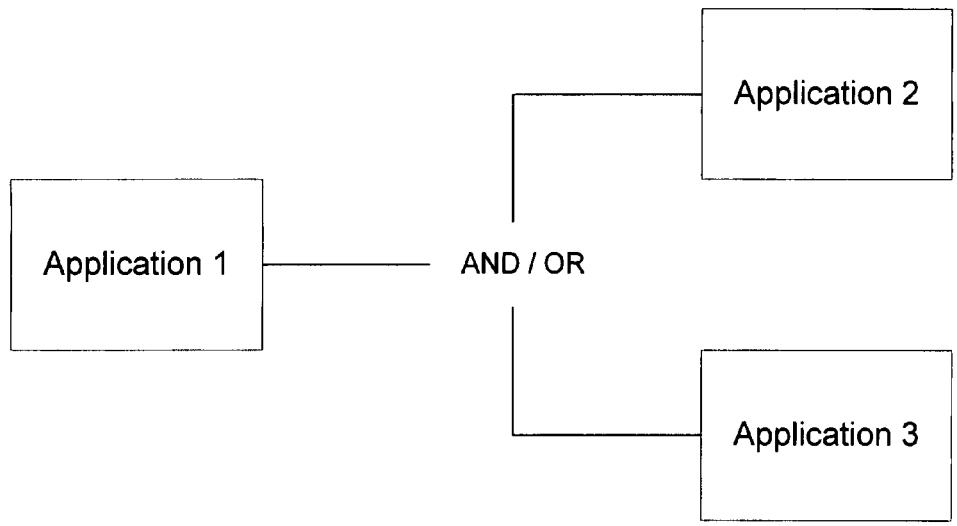
FIG. 8A shows a logical view of a data path for the flow of packets, which is non-linear

A programmable service path structure may also be non-linear such as shown in FIG. 8A. "AND" and "OR" operators are primitives that may be used by programmers/users to construct a logical service path structure and link different applications. In particular, the AND operator replicates packet flows. For instance, with use of an AND operator in FIG. 8A, packet flows would be duplicated for applications 2 AND 3. In other words, if a packet flow is to be replicated, meaning creating two or more copies, one copy of the packet flow will follow the upper path to application 2, and one duplicate copy of the packet flow will follow the lower path to application 3.

Whereas, the OR operator selects a particular one of at least two subpaths. In particular, with use of an OR operator in FIG. 8A, packet flows would either be sent to application 2 OR application 3, such as for load balancing.

Thus, using the basic flow operators AND and OR, it is also possible to logically link a next application with a prior application by inserting either operator between applications to provide a link.

It is noted that when there is only one branch, the AND or OR operators may be used as links between applications in a linear fashion. Thus, referring back to FIG. 8, each application 1, application 2, . . . , application N, may be linked together using the AND or OR operators. Thus, AND or OR operators may link multiple branches.

Figure 8B:
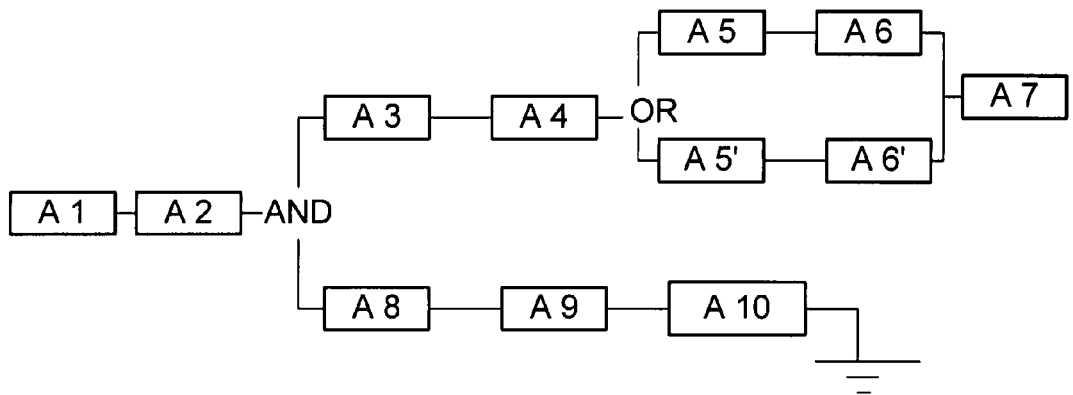
FIG. 8B shows an extensive example of how applications may be linked together using AND and OR operators.

FIG. 8B shows a more extensive example of how applications may be linked together using AND and OR operators. Once a structure is defined it needs to be mapped to into the physical implementation. That is, the structure of FIG. 8B is a logical structure showing how the service applications are linked. Once this logical structure is developed, it is possible to map the logical structure into platform 106 by installing different applications onto service cards 102, and creating a path routing structure using the OR and AND operators.

In one embodiment, it is also possible to include external devices or functions within the service path structure that my not be integrated into platform 106. It is possible to define a service path structure that flows through one or more I/O cards 106 and service cards 102, then flows out of platform 106 to an external device, which processes the packets. After the external device processes the packets, they are sent back to platform 106, and the packets continue to be processed by the service path structure until they exit platform 106. Thus, a service path structure may include external elements, which may be connected to I/O ports of an I/O card or service cards with external ports to handoff packets to an external device.

Exemplary Computing Platform for Service Card

Figure 9:
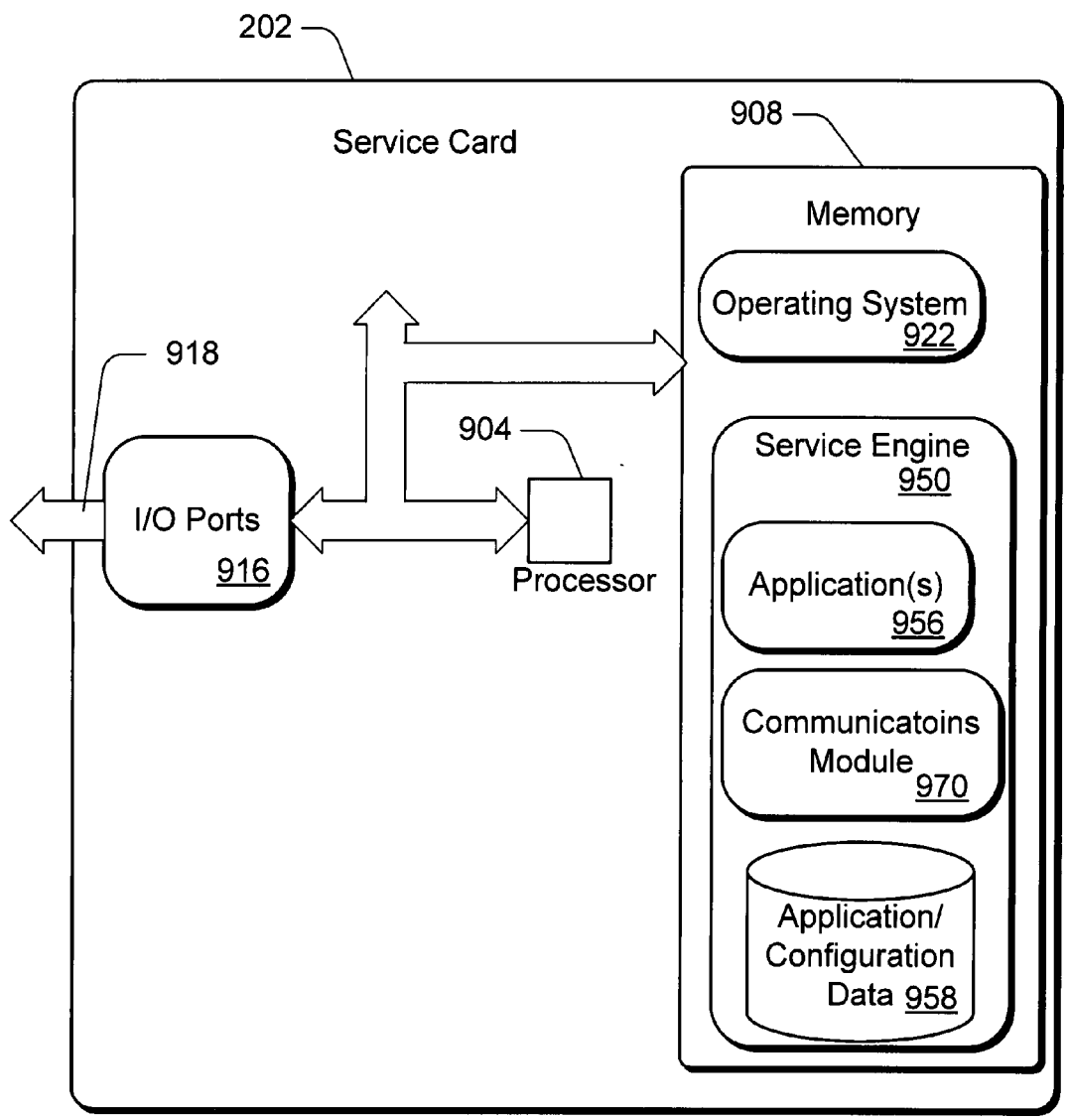
FIG. 9 illustrates a generic platform for implementing a service card, within which aspects of the invention can be either fully or partially implemented.

FIG. 9 illustrates a generic platform for implementing a service card 202, within which aspects of the invention can be either fully or partially implemented. As mentioned above, each service card is typically a computing device, such as a blade, or a circuit board. However, service card 202 may be other general or special purpose computing devices.

In one embodiment, service card 202 includes at least one processor 904, and memory 908. Memory 908 may include volatile memory (e.g., RAM) and/or non-volatile memory (e.g., ROM). In some implementations, volatile memory is used as part of the computing device's cache, permitting application code and/or data to be accessed quickly and executed by processor 904. Memory 908 may also include non-volatile memory in the form of flash memory, content addressable memory and so forth. It is also possible for other memory mediums having various physical properties to be included as part of service card 202.

A service card 202 can also contain other specialized other hardware assist devices (not shown). For example, it may include a special purpose processor (not shown) that can perform security functions such as encryption/decryption, or payload search engines, in conjunction with a general purpose processor.

Operating system 922 may reside as a component in the form of computer-executable instructions and/or logic within memory 908, and may include a file system that when executed serves as a logical interface between code stored in memory. In one implementation, operating system 922 is the Linux Operating System permitting a completely open platform. Other operating systems may be incorporated into a module 202 as would be appreciated by those skilled in the art having benefit of this disclosure.

Service card 202 may also include one or more Input/Output ports 916 to transmit and/or receive data. I/O ports 916 are typically connected in some fashion to controller 902 (processor 902 and memory 908). I/O ports 916 are usually at least partially implemented in hardware for connecting computing device 900 to a communication link 918, and may include wired as well as wireless capabilities. Communication link 918 may include any suitable connection means for handling the transportation of data to and from service card 202, such as, but not limited to, cable, fiber optics, and wireless technology. Communication link 918 may also include connectors to/from a backplane or faceplate (not shown) of platform 106.

Stored within one or more portions of memory 908 is a service engine 950. That is, service engine 950 includes one or more sets of computer-executable code resident on a computer-readable medium (such as memory 908). Service engine 950 performs functions associated with one or more service applications 956 as mentioned above. Each one of the service applications 956 may be programmed and reprogrammed to perform various packet services.

Service engine 950 may also include application and configuration data 958, such as flow-look up tables used for purposes of choosing a next hop or next point to route packets.

In one implementation, service engine 950 may also include a communications module 970, which is a set of code associated with the communicating between control elements. In one implementation, communications module 970 may include a standard protocol such as "ForCES" for communicating with control elements. Other communication protocols could be incorporated in module 202, as would be appreciate by those skilled in the art after having the benefit of this disclosure.

Although described in terms of code, the exemplary service engine 950 may be implemented in hardware, software, or combinations of hardware and software. Additionally, all components of service engine 950 may be communicatively coupled to each other. As would be appreciated by those skilled in the art, many of the components of service engine 950 may be stored and identified as files under control of operating system 922.

In other embodiments, service cards 202 may be implemented as Field Programmable Gate Array (FPGA), ASIC, network processors, or any combination of the above.

Exemplary Extensible Data Planes

Referring back to FIG. 2, much functionality associated with platform 106 is implemented in software which further facilitates reconfiguration and scalability. For example, the quantity of service cards 202, and I/O cards 206 per platform 106 may vary. Additionally, service cards 202, or I/O cards 206 may be added (or removed) as necessary, and fabric 208 is reconfigurable to accommodate the necessary connections. As described above, it is possible to configure and reconfigure service cards 202, I/O cards 206, and fabric 208 to establish the appropriate connections in a dynamic fashion. All such configurations can be loaded in their respective devices via control elements 212 (FIG. 2).

In terms of control, a plurality of control elements 212 can be implemented remotely for platform 106 and/or internally within platform 106. Forwarding plane 201 may logically communicate with control elements 212 as single virtualized unit, as it may not be aware of each individual control element 212. This makes it possible to scale-up and increase the capacity of control plane 203 with more control elements 212 as forwarding plane 201 logically treats control elements as a single virtualized control plane.

Thus, in addition to providing scalability for the forwarding plane 201 platform 106 provides scalability for the control plane 203. In particular, the number of control elements may vary, and additional control elements 212 can be added without platform 106 knowing there is any change, as control elements 212 as a cluster can be virtualized.

The available processing of control elements 212 may cooperate with each other to share the processing burden of the control plane as necessary. As such, the processing capability afforded by the control plane of platform 106 may be scaled throughout the life of platform 106 by adding control elements 212, which increases control processing resources for the forwarding elements.

Based on the foregoing, platform 106 provides scalability in an independent fashion from the control plane and the forwarding plane, including scalability for I/O. Depending on the control plane and forwarding plane resources, as well as the number of I/O cards and associated ports, fabric 208 can be configured dynamically to accommodate additional service cards 202, or I/O cards 206.

As fabric 208 is implemented using a switched network (gigabit Ethernet), it supports simultaneous communications, without requiring the respective communicating entities to wait for network availability prior to communicating with each other. Thus, the connections between modules are not fixed and are effectively under software control, thereby avoiding physically static connections. Platform 106 as implemented will include an appropriate backplane for facilitating the connection of each of the elements described above, as would be readily appreciated by those skilled in the art having the benefit of this disclosure.

Exemplary Extensible Control Plane

As control elements 212 may be implemented in a virtual fashion, it is possible to deploy new service functionalities executed by feature servers 214, in a sandbox.

Figure 10:
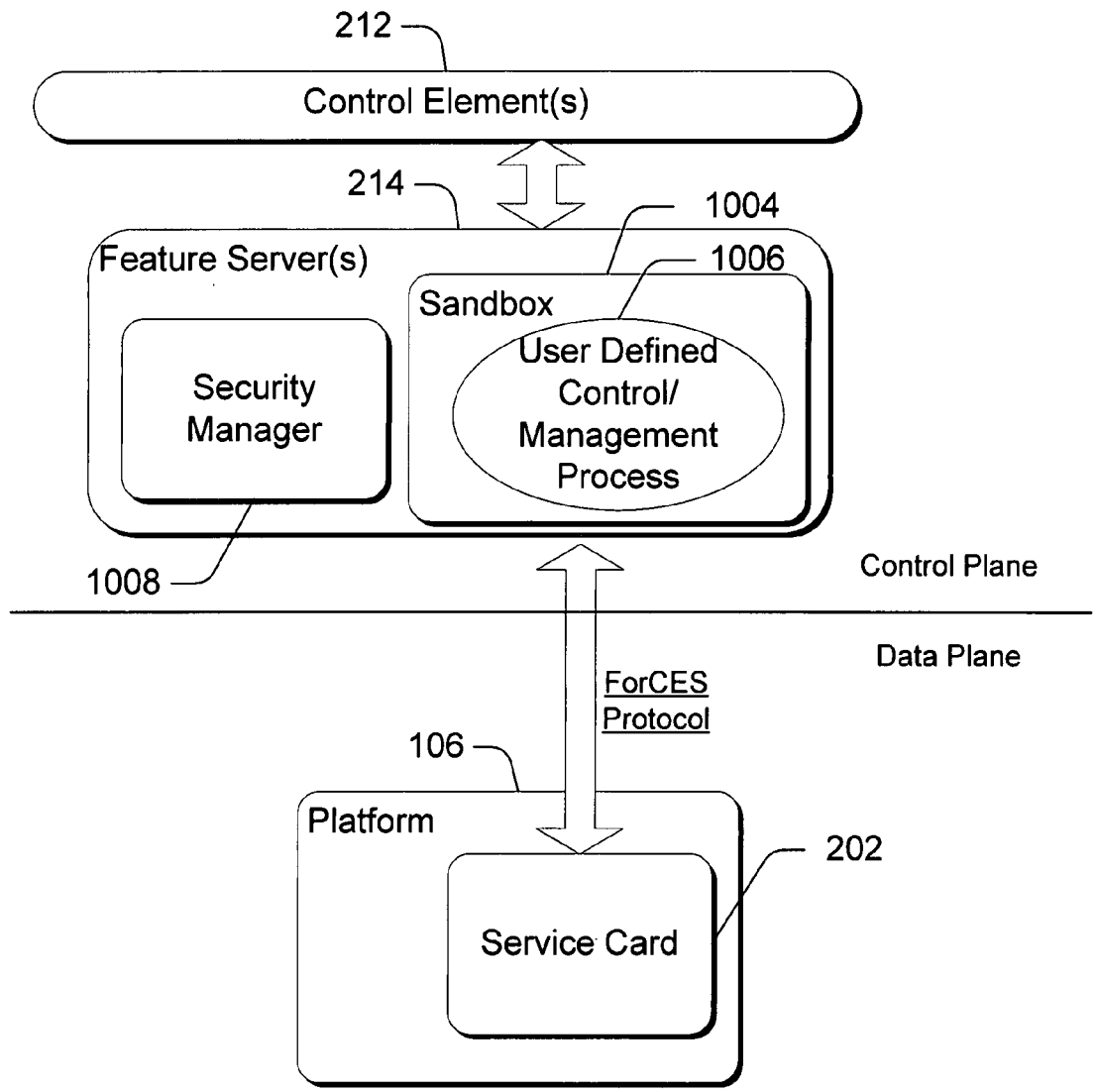
FIG. 10 illustrates a logical view of a feature server implemented as part of a control plane for an integrated platform, which includes a sandbox.

FIG. 10 illustrates a logical view of a feature server 214 implemented as part of control plane 203 for platform 106, which includes a sandbox 1004. Sandbox 1004 allows service functions to be carried out inside a protected environment which is partitioned from data and code residing in memory. As all code is executing in a restricted environment, which protects code and data stored in memory used by control plane 203 as well as forwarding plane 201.

In one implementation, feature server 214 includes a sandbox 1004, which is a partitioned area of memory in which code 1006 created by an end-user is installed. Sandbox 1004 is an area of memory in the control plane that is segregated from other areas of memory in which trusted application code or operating system code resides. Sandbox 1004 creates an environment in which there are strict limitations on what system resources the code created by a user can request or access. A security manager 1008 implemented in software guarantees that no run-time environment is replaced by the code in sandbox 1004, which has access through a well defined Application Programming Interface (API). Security manager 1008 also blocks any operations in which it is possible to perform a dangerous operation which could cause harm to the system. Security manager 1008 has the option to veto the operation by generating a security exception.

In another embodiment, a sandbox can be defined for each application. That is, there may be different sandboxes for each service application.

More specifically, a feature server 214 implemented with customer implemented application may directly access an existing control state of platform 106 in a safe and efficient manner. The safety offered by a feature server 214 is guaranteed through use of a restricted functional API and the use of logical or physical sandboxes 1006.

Exemplary Method of Securing Data

Figure 11:
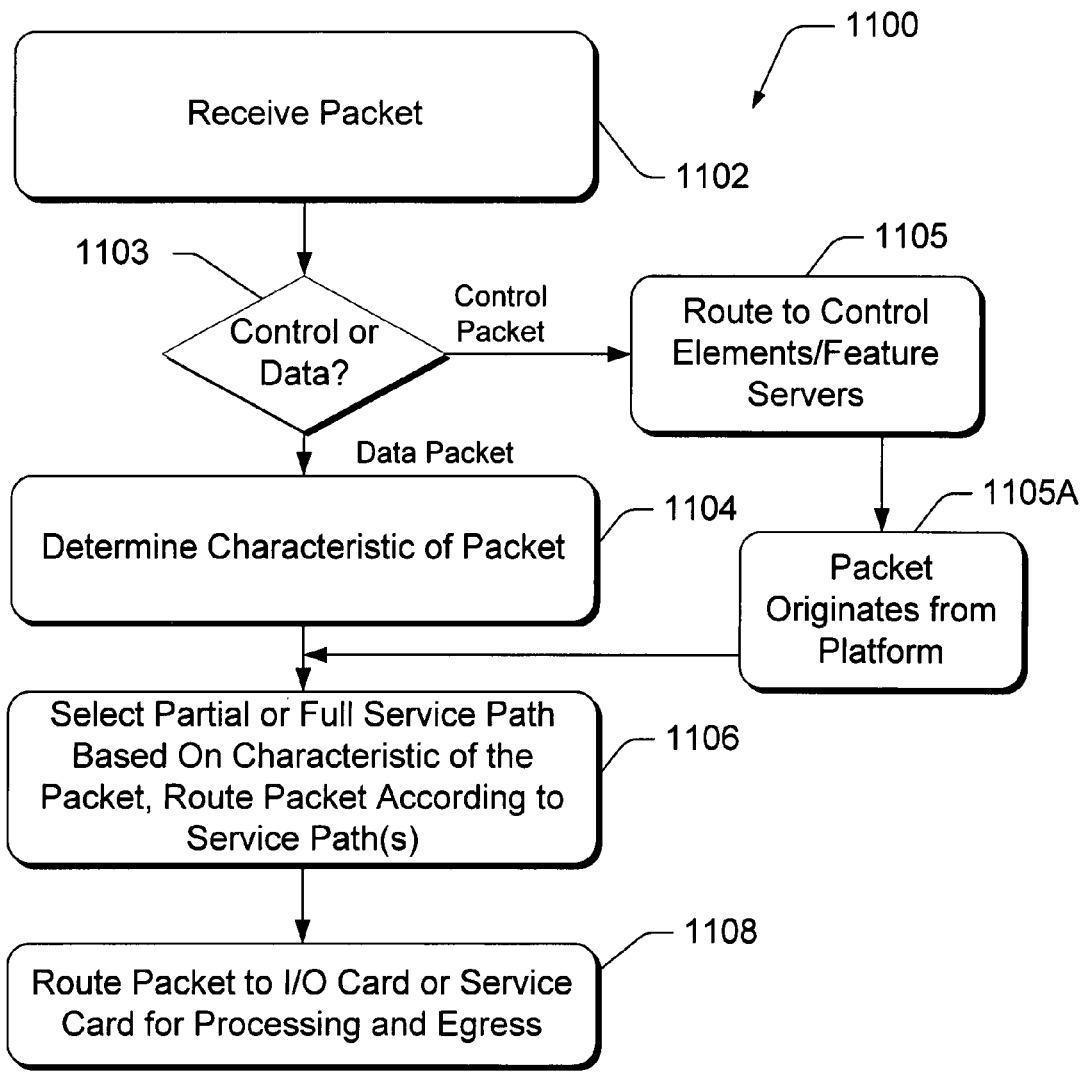
FIG. 11 illustrates an exemplary method for flexibly routing packets through a platform having disparate network functions.

FIG. 11 illustrates an exemplary method 1100 for flexibly routing packets through a platform 106 having disparate network functions. Method 1100 includes blocks 1102, 1103, 1104, 1105, 1105A, 1106, and 1108, (each of the blocks represents one or more operational acts). The order in which the method is described is not to be construed as a limitation, and any number of the described method blocks can be combined in any order to implement the method. Furthermore, the method can be implemented in any suitable hardware, software, firmware, or combination thereof.

In block 1102, a data packet is received by platform 106. For example, a packet is received at ingress port of platform 106 (FIG. 2).

In a decisional block 1103, a determination is made whether the packet is a control or data packet. If in block 1103, the incoming packet is determined to be a control packet, process 1100 proceeds to block 1105. In block 1103, the packet is routed to one or more feature servers or control elements.

On the other hand, if in block 1103, the incoming packet is determined to be a data packet, process 1100 proceeds to block 1104. In block 1104, a characteristic of the packet is determined based on header or payload information.

Additionally, it is possible for platform 106 to originate packets, such as packets originating from control elements 212 or feature server 214, based on packets received in block 1102. Accordingly, in block 1105A, a packet may originate from control elements or feature servers.

In block 1106, a flow-ID is inserted in the header of a packet relaying information indicating which service path (or next hop—i.e., sub-path) of a logical service path (full path) the packet is to follow. This logical path may be selected from one out of a plurality of different service paths, which are configurable and reconfigurable. Each flow-ID is configured to link a completion of processing of one specific segment of processing associated with one of the service cards (service applications) to a start of processing of another specific segment of another of the service cards such that each portion of processing of the packets can be performed in a specific order and by any of the plurality of service cards specified by the plurality of service paths. The packet is routed to service cards in accordance with the logical path selected, and each service application is executed.

In block 1108, the packet is routed from a service card to an I/O card, which is configured to route the packet to a port for egress of the packet out of the platform. The flow-ID or some other pointer, or message may be used to link the service path with the data card for routing of the packet to the data card.

It is should be appreciate by those skilled in the art having the benefit of this disclosure that certain operational acts of method 1100 may be performed differently. For example, it may not be necessary to insert flow-ID into the packets to select a service path. Instead, each service card may be configured to selected a next-hop or service chain based on characteristics of the payload or header associated with a packet. Additionally, one or more service cards may have dedicated tables for determining a next-hop of a packet. Still further information inserted in field headers without adding additional bits that may be relied on to select a service path.

Additionally, any exemplary functionality provided by a service card, logical path or functional block may be described in the general context of computer-executable code being executed by a processor of a computer. Generally, computer-executable code include modules, routines, programs, objects, components, data structures, logic, and other executable code that perform particular tasks or implement particular abstract data types when executed by a computing device. Computer-executable code may be located in a computer-readable-medium, such as but not limited to, local, remote, and/or distributed computer storage media including memory storage devices.

Figure 12:
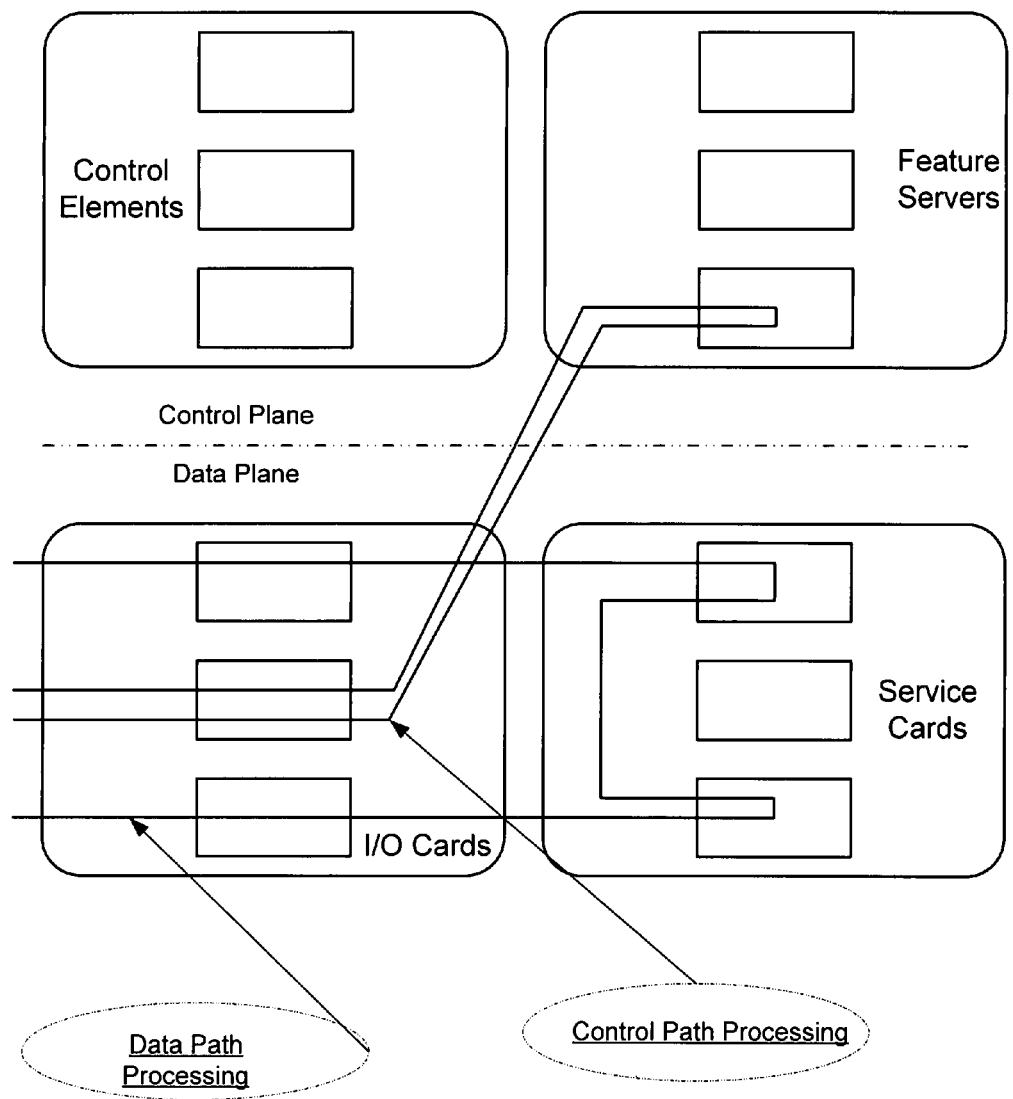
FIG. 12 is a logical block diagram showing how a control packet flow is routed to feature servers a control plane, and a data packet flow is routed to service cards of a forwarding plane.

FIG. 12 is a logical block diagram showing how a control packet flow is routed to feature servers 214, and a data packet flow is routed to service cards 202 of forwarding plane 201.

Figure 13:
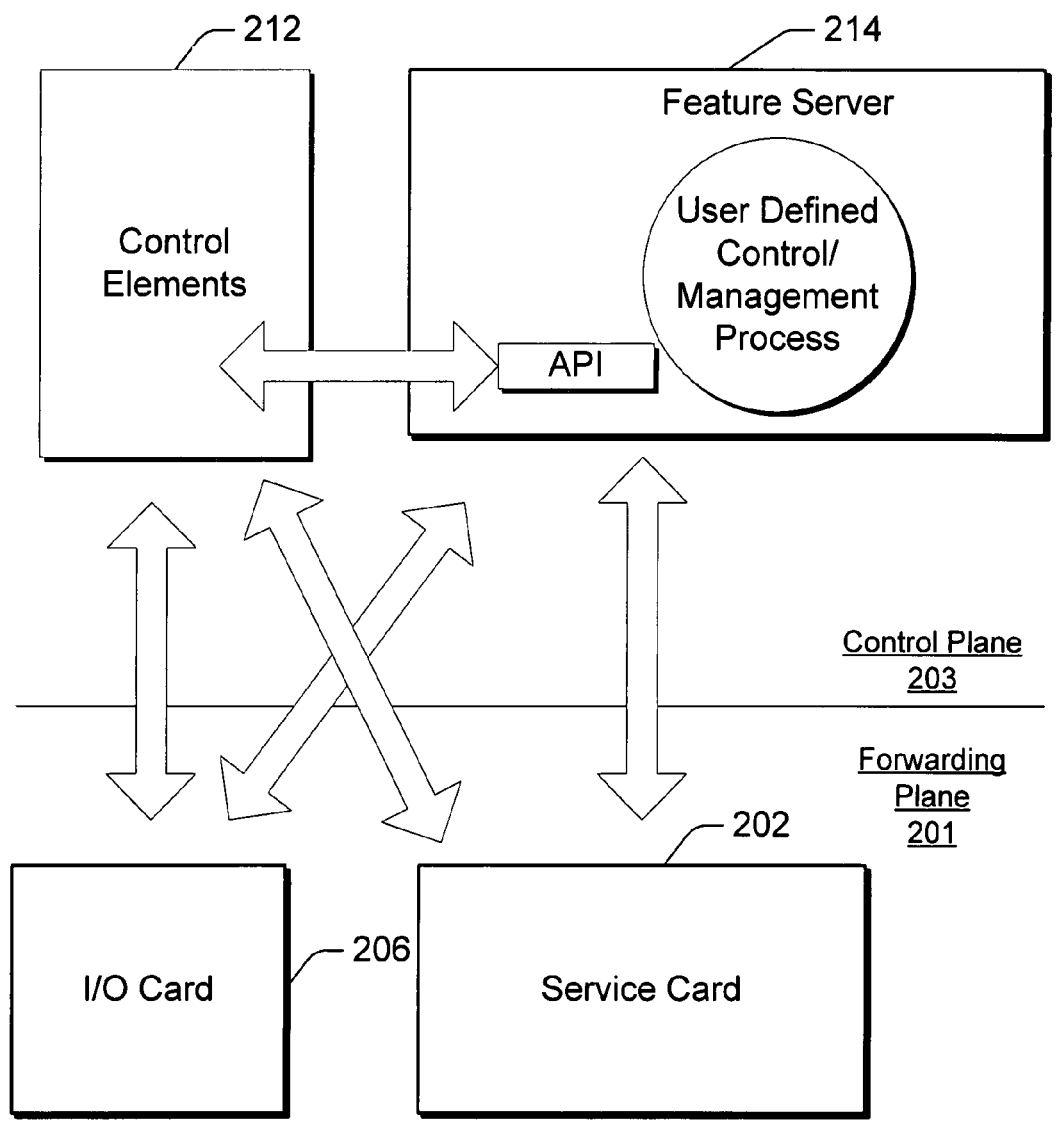
FIG. 13 shows a programming model of how it is possible to implement user defined control/management processes in a feature server to access core control functions of a platform.

FIG. 13 shows a programming model of how it is possible to implement user defined control/management processes in a feature server 214 to access core control functions of platform 106, such as control elements 212. A feature server 214 may also communicate with a service card 202 in the forwarding plane 201. A feature server also allows extension of the control function of platform 106 to permit a customer to add its own value-added features to applications. Some examples of such value added features include: customer routing, custom protocol processing, custom network measurement, custom data management Custom routing—standard shortest path routing as commonly used in IP routing may not be suitable for certain applications. For example, VoIP should be routed along a least delay path rather than a shortest path. In general, a carrier (or its customers) may have its special routing requirements that do not mesh well with traditional protocols. Force fitting of such routing requirements on a shortest path routing framework can be unwieldy. The ability to host custom routing protocol can solve this problem. With this, a customer can deploy its own version delay-based routing and even inter-domain QoS routing with its peers.

Custom protocol processing—The emergence of IPTV has brought renewed attention to IP multicast. A key challenge to IPTV is the ability to perform fast channel change. This is typically implemented as multicast group join and leave, which in turns relates to IGMP processing. Specialized IGMP processing can provide a customer unique differentiation to its IPTV network.

Custom network measurement—Basic network measurements provide statistics only at the transport level, e.g., queue length, link utilization, etc. A carrier can indirectly infer the performance of an application using these measures. A way to understand application performance is to directly measure it at the application level. For example, with an extended control plane, it is relatively easy to inject VoIP signaling or bearer traffic to directly measure SIP signaling and VoIP quality.

Custom data management—A router collects a lot of internal statistics. The existing way of getting at this statistics is clumsy and inefficient. For example, SNMP is very inefficient if you try to obtain the data at a different granularity. Through feature servers, data can be preprocessed (e.g., aggregated) within platform 106 and exported in a customize format.

It is to be understood that the present invention is not limited to the embodiments described above, but encompasses any and all embodiments within the scope of the subjoined Claims including their equivalents.

What is claimed is:

1. A method for processing a packet in a forwarding plane of a network platform, the method comprising:
    receiving a packet;
    executing a plurality of service applications, each configured to perform a specific segment of processing on the packet, wherein the plurality of service applications are executed by the network platform; and
    linking, through a user-defined programmable service path structure, completion of processing of one specific segment of processing associated with one of the service applications to a start of processing of another specific segment of another of the service applications such that each portion of processing of the packet can be performed in a specific order and by any of the plurality of service applications specified by the user-defined programmable service path structure.

2. The method as recited in claim 1, further comprising determining a next-hop or destination for the packet.

3. The method as recited in claim 1, further comprising determining a next-hop or destination of the packet, wherein the determination of the next-hop or destination of the packet is decoupled from the execution of the plurality of service applications.

4. The method as recited in claim 1, wherein the linking of completion of processing of one specific segment of processing associated with one of the service applications to a start of processing of another specific segment of another of the service applications through the user-defined programmable service path structure is accomplished by use of at least one logical primitive: an "AND" operator—causing flow replication—or an "OR" operator—causing flow distribution.

5. The method as recited in claim 1, wherein at least one of the plurality service applications are embedded as processor-executable code in a computer-readable media on a service card of the platform.

6. The method as recited in claim 1, wherein executing the plurality of service applications includes executing applications associated with network security comprising at least one of a firewall process, a Deep Packet Inspection process, a virus detection process, and a denial of service detection process.

7. The method as recited in claim 1, wherein executing the plurality of service applications includes executing applications associated with traffic accounting/monitoring.

8. The method as recited in claim 1, wherein the method is performed by a network platform.

9. A method, comprising:
    processing a packet through a forwarding plane of a network platform including:
        receiving a packet;
        determining a characteristic associated with the packet;
        selecting a particular one out of a plurality of programmable service path structures for processing the packet, the selection based on the determined characteristic of the packet, wherein each programmable service path structure includes one or more service applications, each configured to perform a specific segment of processing on the packet associated with network security, transcoding, or traffic analysis, wherein the one or more service applications are executed by the network platform;
        processing the packet, using the network platform, through the one or more service applications in accordance with the programmable service path structure; and forwarding the packet from the network platform.

10. The method as recited in claim 9, wherein at least one of the plurality service applications are embedded as processor-executable code in a computer-readable media on a service card of the platform.

11. The method as recited in claim 9, wherein at least one of the plurality of service applications comprises a virus detection system.

12. The method of claim 9, wherein at least one of the plurality of service applications comprises a firewall system.

13. The method as recited in claim 9, wherein at least one of the plurality of service applications comprises a denial of service detection system.

14. A system for processing a packet in a forwarding plane of a network platform, the system comprising:
    means for receiving a packet;
    means for executing a plurality of service applications, each service application configured to perform a specific segment of processing on the packet; and
    means for linking, through a user-defined programmable service path structure, completion of processing of one specific segment of processing associated with one of the service applications to a start of processing of another specific segment of another of the service applications such that each portion of processing of the packet can be performed in a specific order and by any of the plurality of service applications specified by the user-defined programmable service path structure.

15. The system as recited in claim 14, further comprising means for determining a next-hop or destination for the packet.

16. The system as recited in claim 14, wherein the means for executing the plurality of service application includes at least one service card.

17. The system as recited in claim 14, wherein the means for linking includes at least one logical primitive: an "AND" operator—causing flow replication—or an "OR" operator—causing flow distribution.

18. The system as recited in claim 14, wherein at least one of the plurality service applications is embedded as processor-executable code in a computer-readable media.

* * * * *